June 1, 1954   S. H. BERCH ET AL   2,679,966
ICE CREAM PACKAGING MACHINE
Filed Oct. 14, 1950   13 Sheets-Sheet 1

SAMUEL H. BERCH
MARCELLUS C. LUTERICK
INVENTORS

BY

ATTORNEY

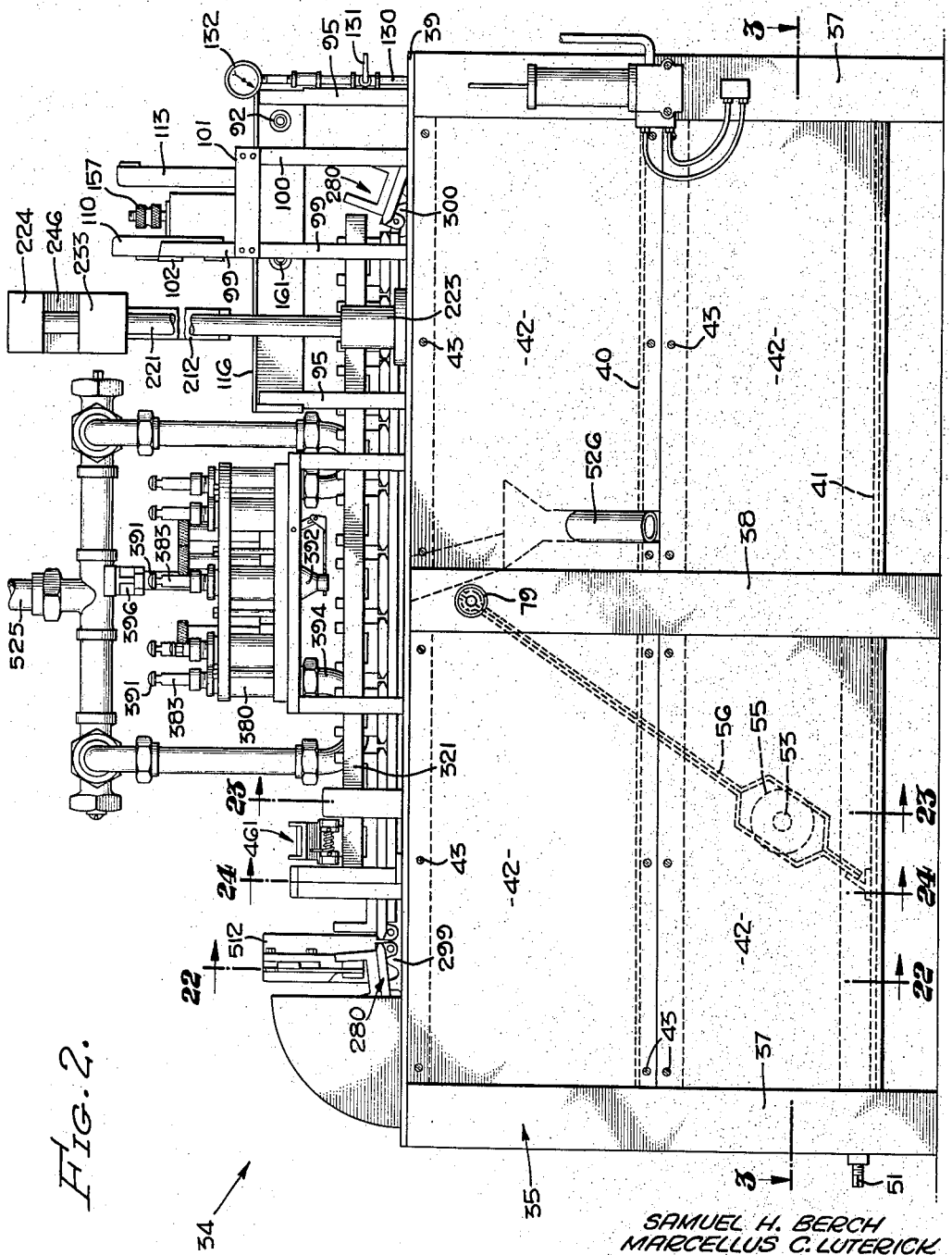

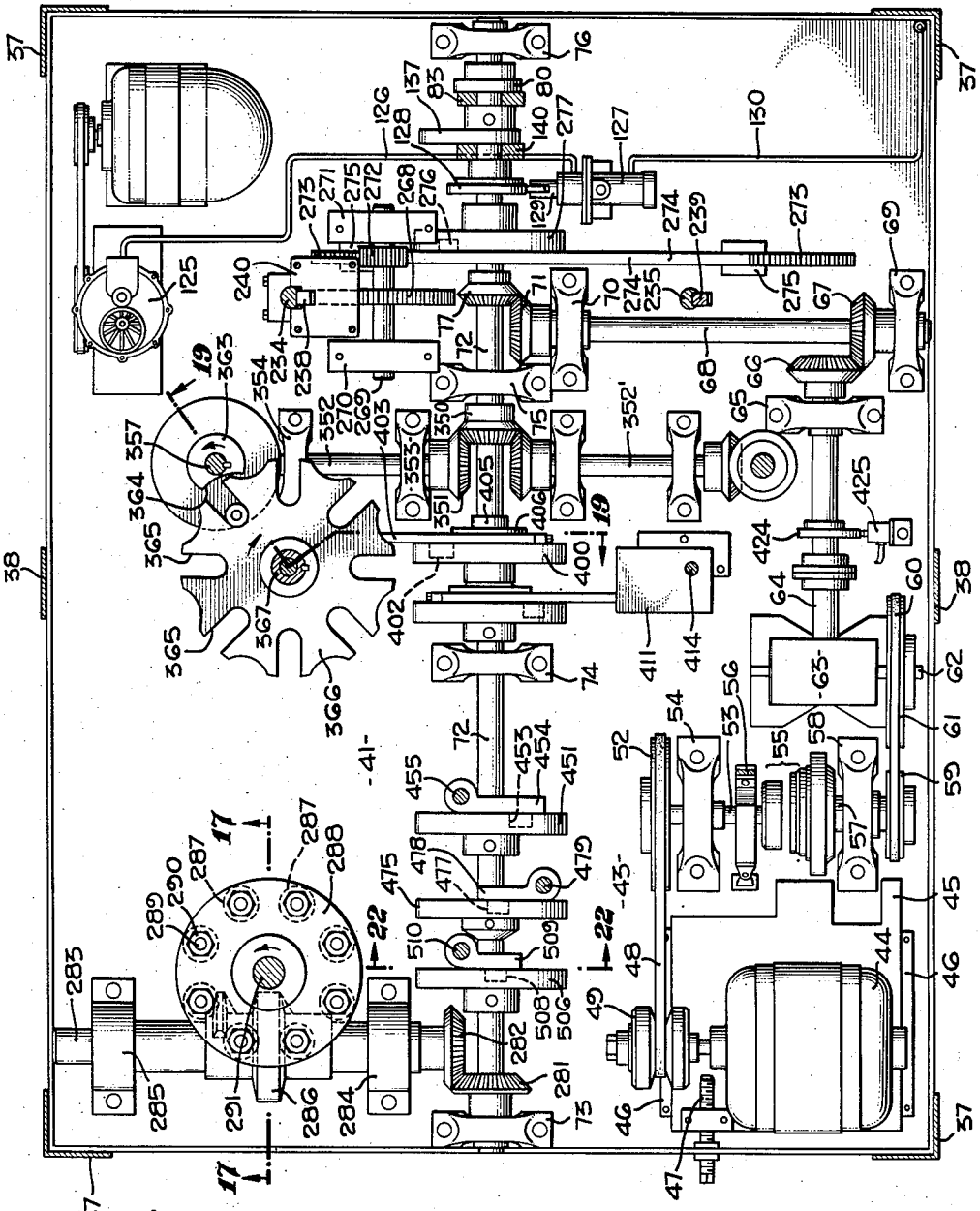

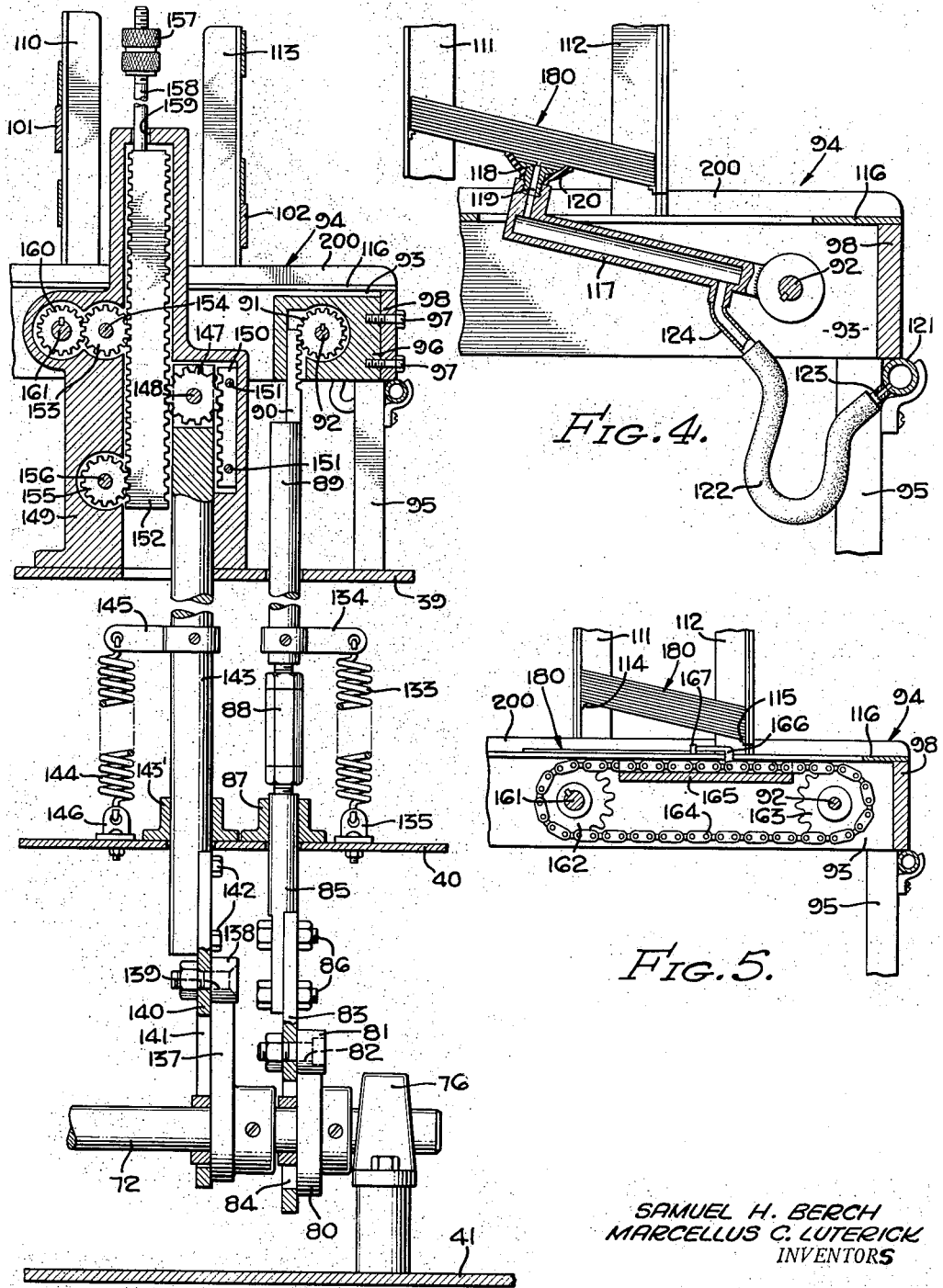

June 1, 1954  S. H. BERCH ET AL  2,679,966
ICE CREAM PACKAGING MACHINE
Filed Oct. 14, 1950  13 Sheets-Sheet 5

SAMUEL H. BERCH
MARCELLUS C. LUTERICK
INVENTORS

BY

ATTORNEY

June 1, 1954  S. H. BERCH ET AL  2,679,966
ICE CREAM PACKAGING MACHINE
Filed Oct. 14, 1950  13 Sheets-Sheet 6

SAMUEL H. BERCH
MARCELLUS C. LUTERICK
INVENTORS

BY
ATTORNEY

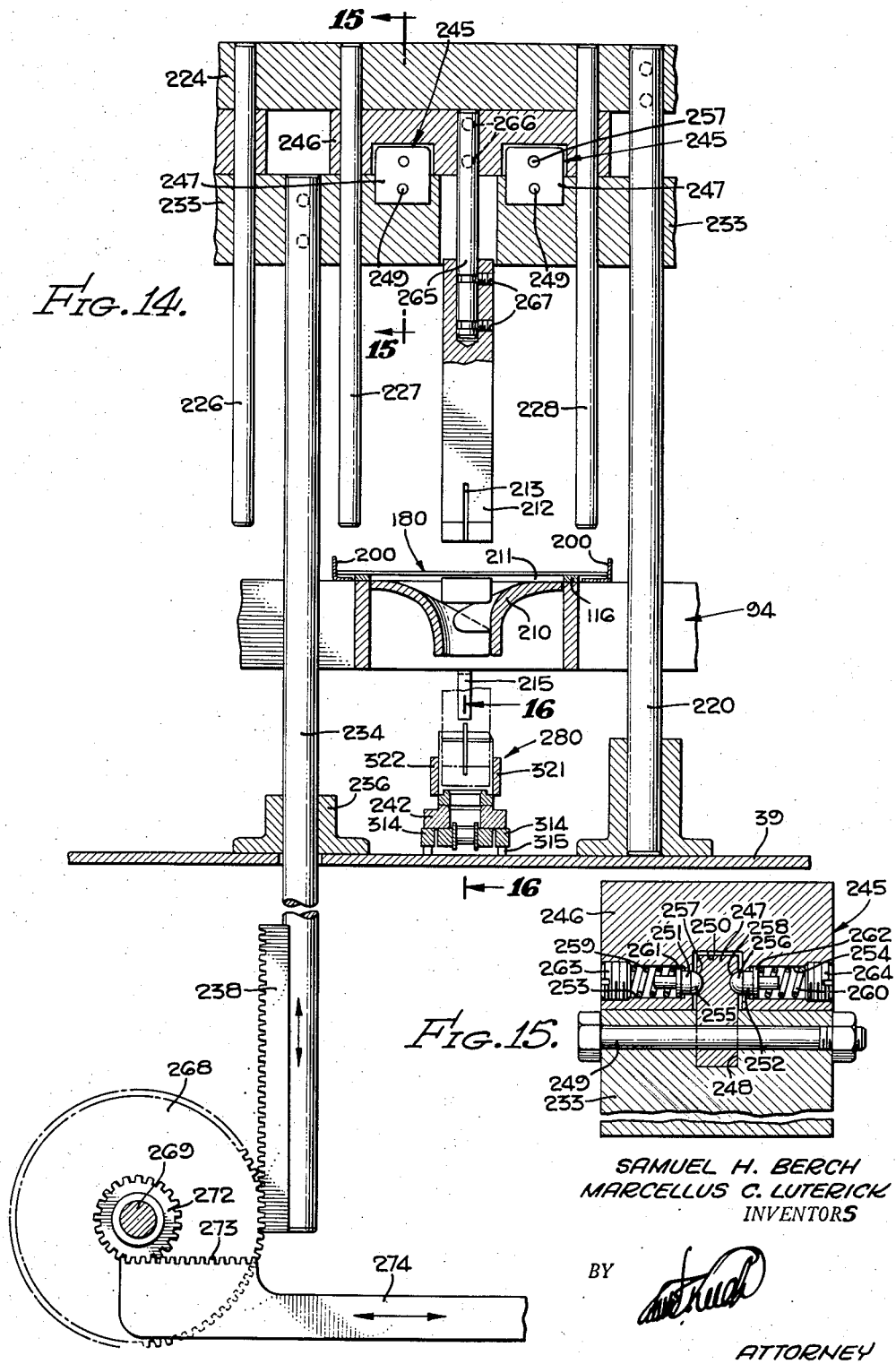

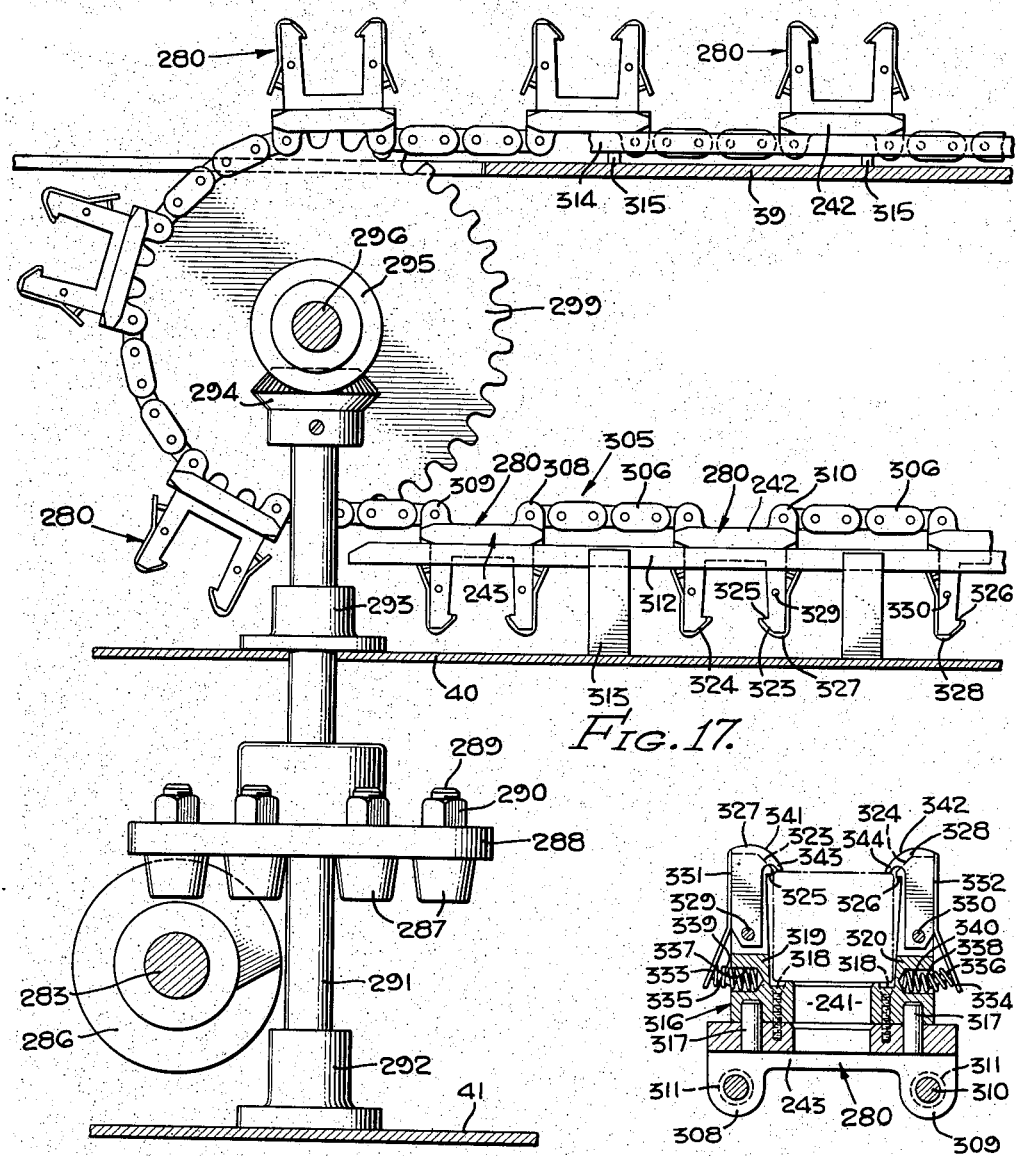

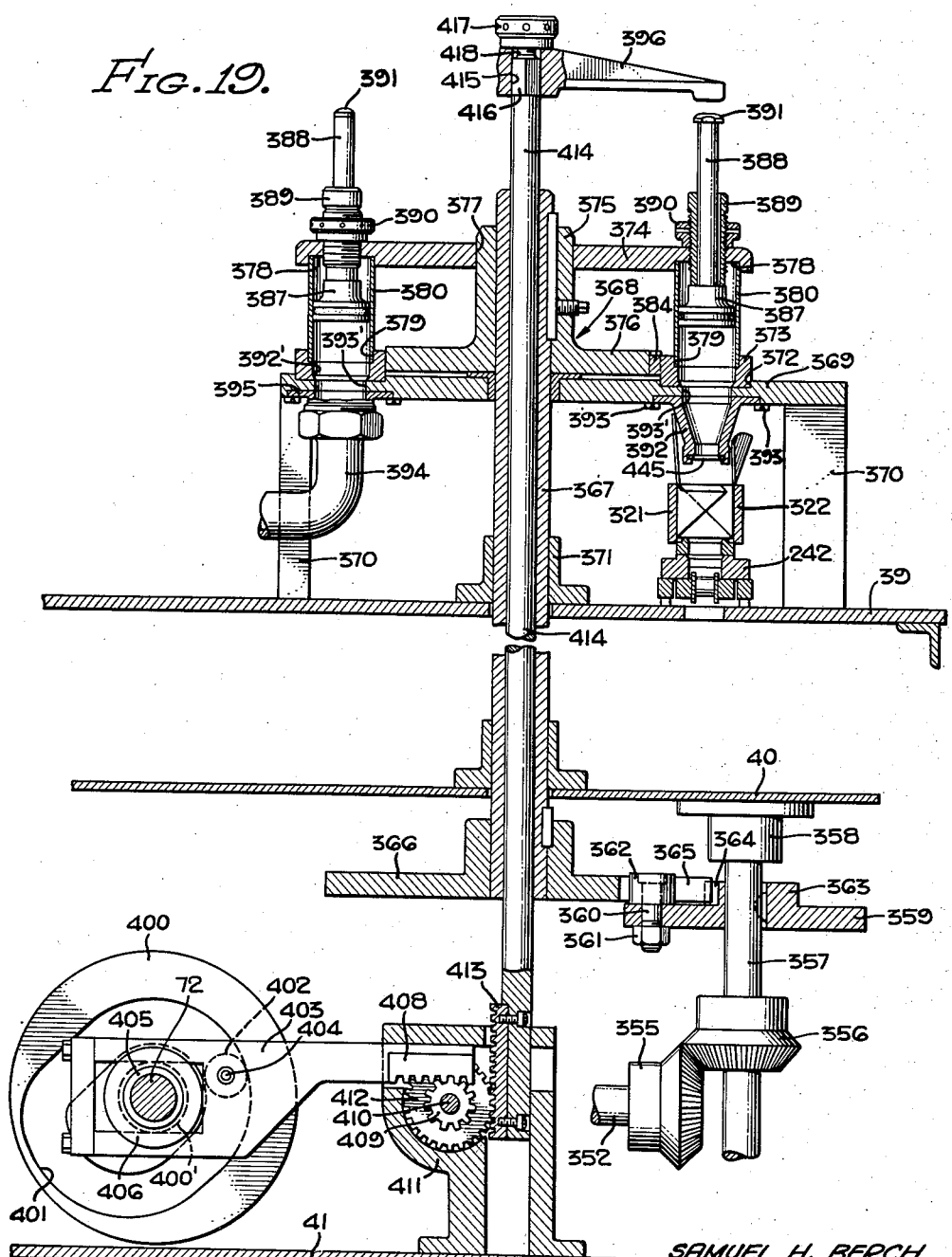

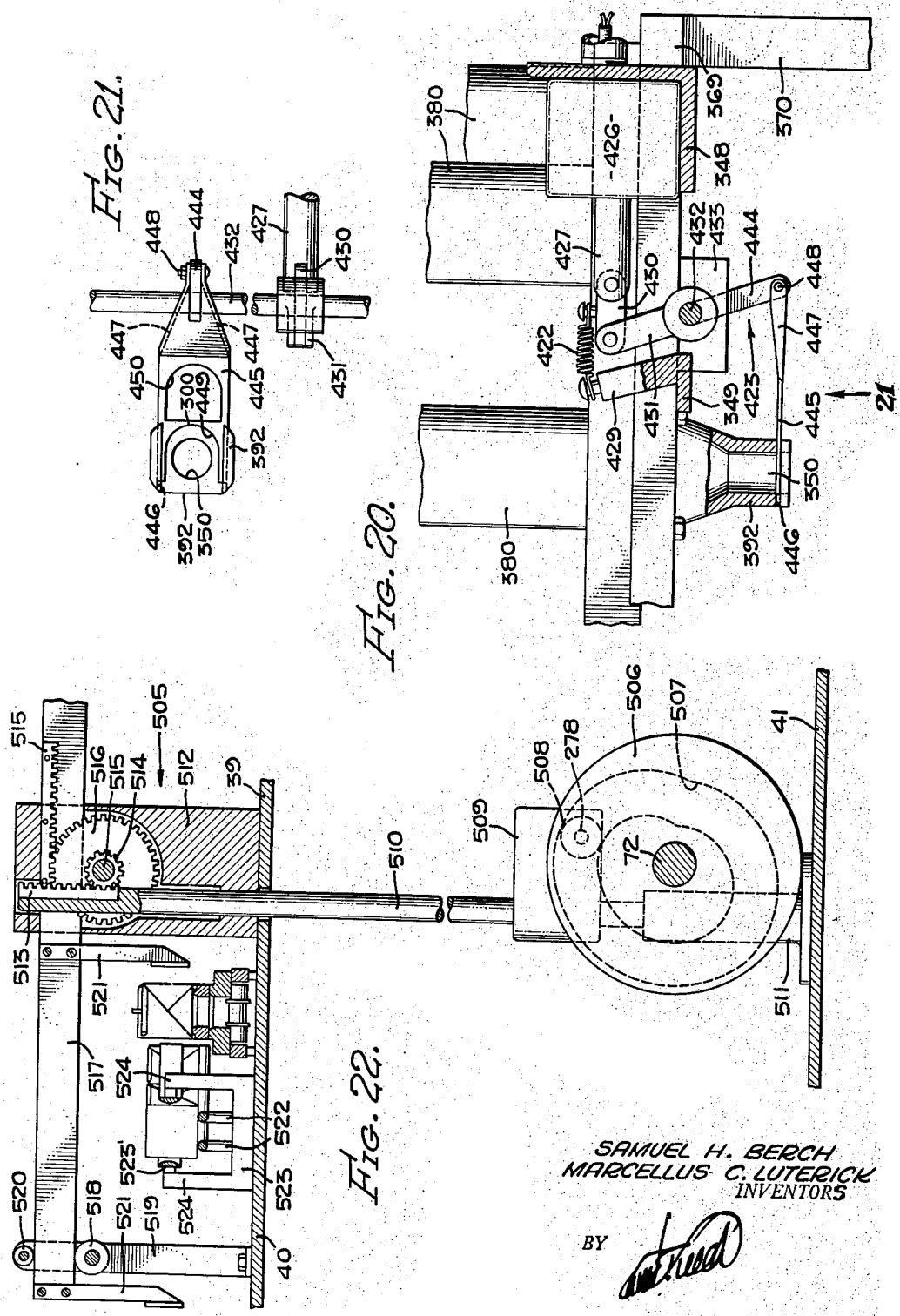

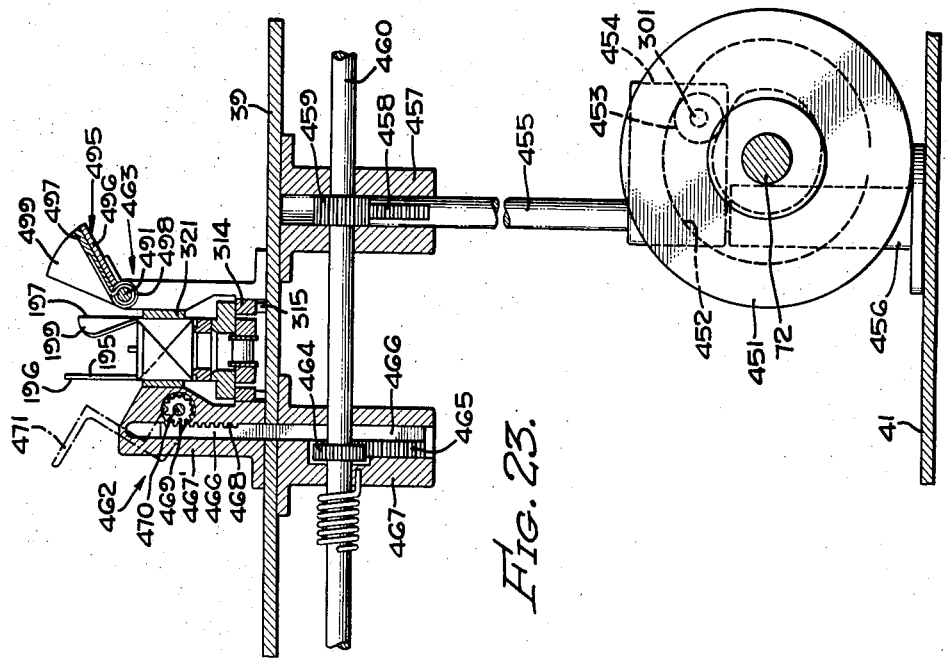
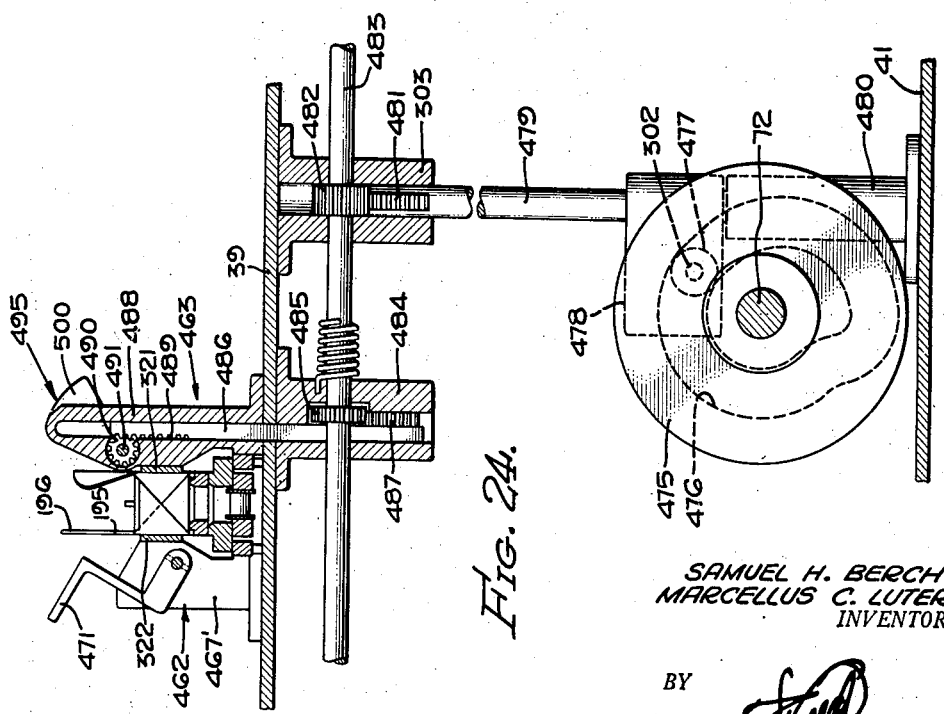
SAMUEL H. BERCH
MARCELLUS C. LUTERICK
INVENTORS
BY
ATTORNEY June 1, 1954  S. H. BERCH ET AL  2,679,966
ICE CREAM PACKAGING MACHINE
Filed Oct. 14, 1950  13 Sheets-Sheet 12
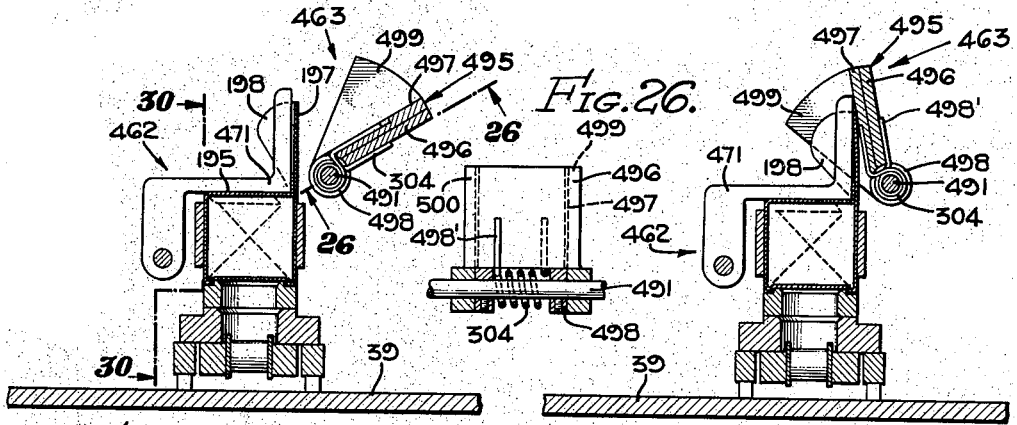
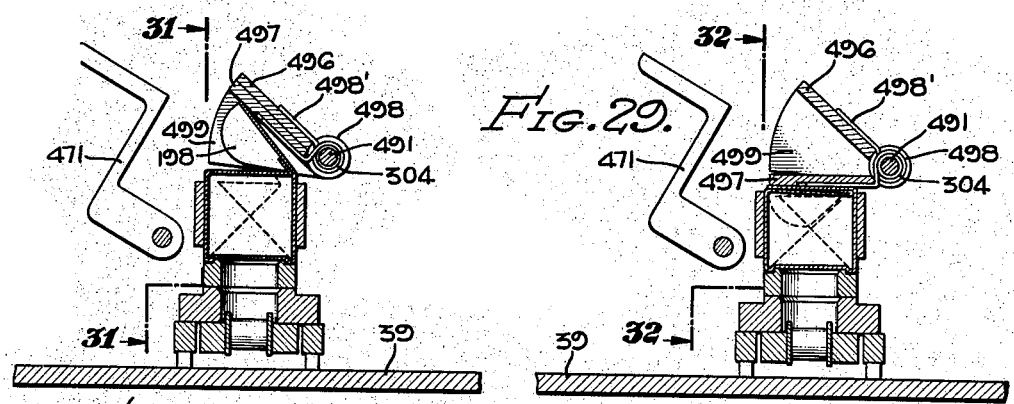
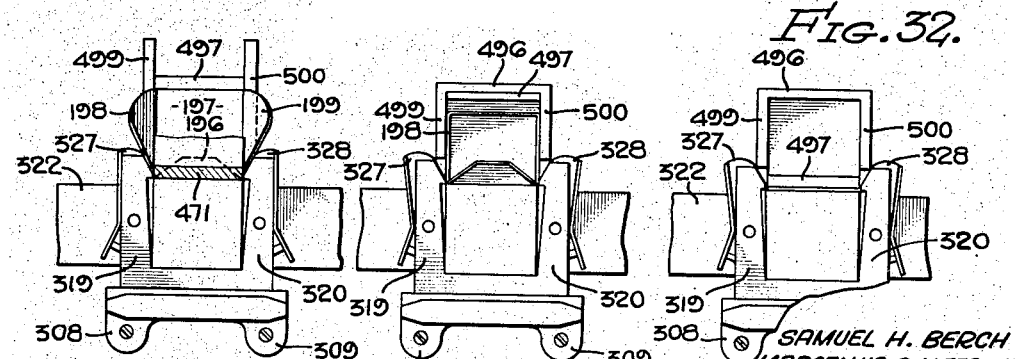
SAMUEL H. BERCH
MARCELLUS C. LUTERICK
INVENTORS
BY
ATTORNEY

FIG. 33.

Patented June 1, 1954

2,679,966

UNITED STATES PATENT OFFICE 2,679,966

ICE CREAM PACKAGING MACHINE

Samuel H. Berch, Beverly Hills, and Marcellus C. Luterick, Montrose, Calif., assignors, by mesne assignments, to Diced Cream of America Co., Los Angeles, Calif., a corporation of Delaware Application October 14, 1950, Serial No. 190,202

2 Claims. (Cl. 226—97)

This invention relates to packaging apparatus and is particularly designed to provide certain improvements over the apparatus disclosed in U. S. Letters Patent No. 2,500,922, issued March 21, 1950, to Samuel H. Berch.

The apparatus shown in said patent, as well as the improvements disclosed herein, are especially adapted for packaging products with a semi-fluid consistency such as that of ice cream at the time it leaves a commercial freezer.

It is an object of our invention to provide an ice cream packaging machine for large volume production of small, closed, self-contained packages of ice cream such as those known in the trade as "Diced Cream."

It is another object of the invention to provide such a machine which occupies a relatively small space and which is simple in construction, accessible for servicing and relatively free from operational difficulties.

The manner of accomplishing the foregoing objects, as well as further objects and advantages, will be made manifest in the following description taken in connection with the accompanying drawings in which:

Fig. 2 is a side elevational view of Fig. 1 taken in the direction of the arrow 2 therein.

Fig. 3 is a horizontal sectional view taken on the line 3—3 of Fig. 2.

Fig. 4 is an enlarged fragmentary cross-sectional view taken on the line 4—4 in Fig. 1 and showing a container blank magazine and a suction device in the act of removing a blank from said magazine.

Fig. 5 is an enlarged fragmentary cross-sectional view taken on the line 5—5 of Fig. 1 and showing said blank magazine and the feed means for feeding a blank removed from said magazine to the container forming device.

Fig. 6 is a diagrammatic enlarged fragmentary cross-sectional view taken on the line 6—6 of Fig. 1 and shows the mechanism for controlling the removal and feeding of a blank as illustrated in Figs. 4 and 5.

Fig. 14 is a cross-section taken on the line 14—14 of Fig. 13 and further illustrating the mechanism for actuating the container forming plungers of the invention.

Fig. 15 is an enlarged sectional detail taken on the line 15—15 of Fig. 14 and showing a detent device which automatically releases the power drive from any one of the container forming plungers when the latter encounters an excessive resistance to its passage through the forming die.

Fig. 16 is an enlarged cross-sectional view taken on the line 16—16 of Fig. 14 and illustrates the construction of one of the buckets which constitutes a form for receiving a container and holding the same in its true shape while it is being filled, closed and sealed.

Fig. 17 is an enlarged diagrammatic vertical sectional view taken on the line 17—17 of Fig. 3 and illustrates the intermittent drive for the production line chain conveyors which carry said container forming buckets in said machine.

Fig. 18 is an enlarged fragmentary detail view taken on line 18—18 of Fig. 1 and illustrates a detail of the construction of one of the ice cream container filling devices of the invention.

Fig. 19 is an enlarged composite cross-sectional view, the upper half of which is taken on line 19—19 of Fig. 1 and the lower half of which is taken on the line 19—19 of Fig. 3 and illustrates the construction of said filling device and the drive mechanism therefor.

Fig. 20 is an enlarged fragmentary detail view with portions thereof in section taken on the line 20—20 of Fig. 1 and illustrates the solenoid actuated flow cutoff mechanism associated with the delivery spouts in said container fillers.

Fig. 21 is a fragmentary bottom plan detail view looking upwards as indicated by arrow 21 in Fig. 20.

Fig. 22 is an enlarged diagrammatic cross-sectional view taken on the line 22—22 of Fig. 2 and illustrates the container kick-out mechanism and the drive means therefor.

Fig. 23 is an enlarged diagrammatic sectional view taken on the line 23—23 of Fig. 2 and illustrates the drive mechanism for the device for accomplishing the initial step in the closing and sealing operation.

Fig. 24 is an enlarged diagrammatic sectional view taken on the line 24—24 of Fig. 2 and illustrates the drive mechanism for the device for performing the final step in the container closing and sealing operation.

Fig. 25 is an enlarged cross-sectional view taken on the line 25—25 of Fig. 1 and shows the device for performing the initial step in the closing of the container in its inward position in which one flap of the container is folded across the same.

Fig. 26 is a fragmentary detail sectional view taken on line 26—26 of Fig. 25 and illustrates the mounting of a device for performing the final step of closing and sealing said container.

Fig. 27 is a view similar to Fig. 25 and illustrates the next following step in the container closing and sealing operation.

Fig. 28 is a view similar to Fig. 27 showing the device which performed an initial step in the container closing operation withdrawn and a device for performing the final step closing upon the container.

Fig. 29 is a view similar to Fig. 28 and illustrates the final step in the container closing and sealing operation in which the second flap is presed down upon the container and the ears thereof are extended into open pockets formed by gussets alongside said container.

Fig. 30 is a diagrammatic sectional view taken on the line 30—30 of Fig. 25 and illustrates the initial step in the container closing operation from a different angle.

Fig. 31 is a view similar to Fig. 30 which was taken on the line 31—31 of Fig. 28.

Fig. 32 is a view similar to Fig. 31 and is taken on line 32—32 of Fig. 29.

Fig. 33 is a diagram illustrating the different functions performed by the several mechanisms in said machine during a single revolution of the drive shaft of said machine.

Figure 1:
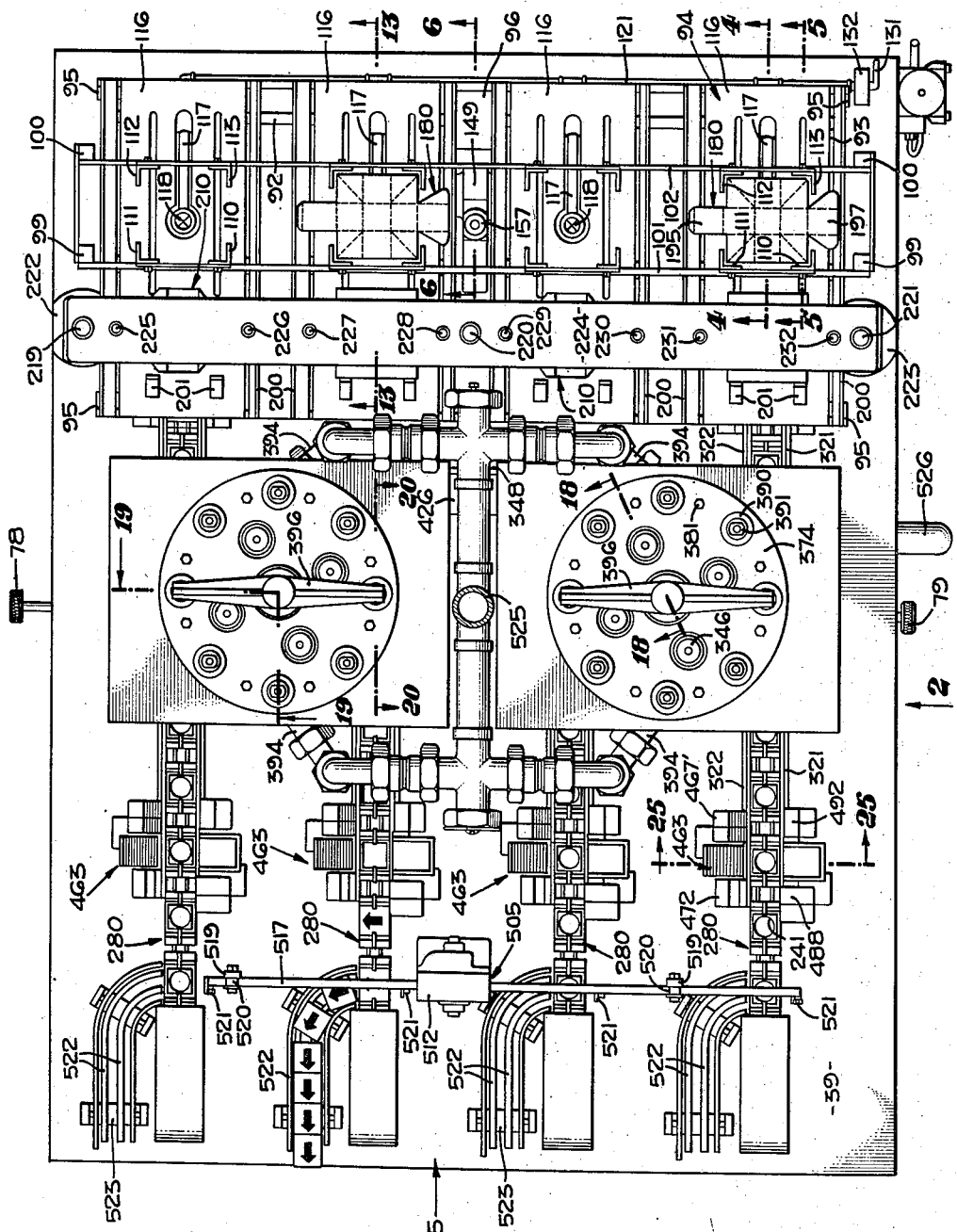
Fig. 1 is a plan view of a preferred embodiment of the invention comprising a compact packaging machine mounting four production lines.

Referring specifically to the drawings, the invention is there shown as embodied in a packaging machine 34 having a rectangular housing 35 including angle iron corner posts 37 and intermediate posts 38, on which posts are mounted a top shelf 39, an intermediate shelf 40 and a heavy bottom shelf 41. The open spaces in the sides and ends of the housing 35 are covered by panels 42, which are removably secured in place by screws 43.

The machine 34 is provided with a main driving motor 44 (Fig. 3) which is mounted on a base plate 45 the latter being slideable in guides 46, which are secured on bottom shelf 41. The plate 45 is adjustably related to the shelf 41 by a screw 47 for adjusting the tightness of a belt 48 which may be trained about a drive pulley 49 of the motor 44. Belt 48 connects pulley 49 with a pulley 52, the latter being fixed on a countershaft 53 which is mounted in a bearing 54, secured to bottom self 41. The shaft 53 operates through a clutch 55 controlled by a clutch lever 56 to drive a driven shaft 57 which is mounted in a bearing 58, also secured to bottom shelf 41. The shaft 57 has a belt pulley 59 fixed thereon. The clutch lever 56 is connected with handles 78 and 79 (Figs. 1 and 2) for the operation of clutch 55 from the outside of housing 35.

A second belt 60 is trained around pulley 59 and around a belt pulley 61 fixed on a driving shaft 62 of a reducing gear 63. A driven shaft 64 of the reducing gear 63 journals in a bearing 65 secured to the bottom shelf 41, and through beveled gears 66 and 67 drives shaft 68 which is mounted in bearings 69 and 70 provided on shelf 41. Shaft 68 carries a beveled gear 71 which engages with a beveled gear 77 mounted on a main driving shaft 72 which journals in bearings 73, 74, 75 and 76 secured upon the bottom self 41 and which drives the component mechanisms of the machine 34.

*Container blank feed*

The main drive shaft 72 (Fig. 3) has mounted thereon at the righthand end thereof a cam 80 engaging a roller follower 81 (Fig. 6) mounted on a pin 82 secured in a plate 83 having an elongated slot 84 therein which rides over the sleeve of the cam 80, said plate being secured at its upper end to the lower end of a length of rod 85 by bolts 86. Rod 85 is guided for vertical movement by bushings 87 secured to the shelf 40 and is adjustably connected by a turnbuckle 88 to a length of rod 89 projecting through the top shelf 39 of the housing. A length of rack 90 is secured to the upper end of rod 89 and engages with gear 91 mounted on a shaft 92 carried in the side member 93 of a frame 94 (Fig. 5) extending across the righthand end of the machine as seen in Fig. 2 and supported above the top shelf 39 of the housing of the machine by vertical members 95. It is to be noted that the main drive shaft 72 extends centrally and longitudinally of the machine, and that the machine operates simultaneously on four identical container forming, filling, closing and discharging lines. The rod 89 is therefore arranged between the second and third lines, gear 91 being positioned in a machined out space in a bearing block 96 (Fig. 6) mounted by studs 97 midway of the front wall 98 of frame 94.

Since there are four identical production lines, only one will be fully described together with mechanism common to the four lines.

Pairs of spaced vertical members 99 and 100 (Figs. 1 and 2) are arranged at each side of frame 94 and between each production line, and horizontal strips 101 and 102 are secured between the vertical members 99 and 100.

Each of the four magazines holding the container blanks is formed by short vertical lengths of angle 110, 111, 112, 113 (Fig. 1) secured in rectangular arrangement to the strips 101, 102. Small angular strips or other supports 114 and 115 are arranged across the vertical lengths of angles 110 and 111 and 112 and 113 respectively so as to support a stack of the blanks in a slightly inclined position.

The top of frame 94 is covered by sheet metal plates 116 which have suitable openings to provide clearance for parts operating on the blanks.

The blanks are withdrawn downwardly from the magazines by suction arms 117 (Fig. 4) one of which is arranged under each magazine, secured to shaft 92, the drive for which has been described, for oscillatory movement therewith. A small bowlshaped head 118, formed with passages 119, is screwed into the end of each arm 117, and a rubber cup 120 is mounted on the head 118 to extend slightly above the rim thereof.

Suction is transmitted through arm 117 to the interior of head 118 and of cup 120 through the bore in the arm and passages in the head from suction line 121 through a length of flexible tubing 122 pushed onto nipples 123 and 124 secured to line 121 and to arm 117 respectively.

Suction is set up in line 121 by an electrically driven vacuum pump 125 (Fig. 3), pipe line 126, vacuum valve 127, which is opened once during each revolution of a cam 128 secured on main drive shaft 72 which operates to push plunger 129 into the valve body, the plunger being urged outwardly by a spring (not shown). The suction is transmitted from valve 127 through pipe line 130, manually adjustable valve 131 (Fig. 2) to line 121, which is fitted with a vacuum gage 132. Shaft 92 normally holds each arm 117 out of contact with the bottom blank in each magazine by the action of a coil spring 133 in tension between an arm 134 secured to rod 89 and an ear 135 secured to shelf 40. By reference to Fig. 33 it will be noted that suction is set up in the suction line during the first half rotation of the driving shaft 72 during which time the arm 117 has been swung upwardly to bring suction cup 118 against the inclined bottom blank in each magazine as shown in Fig. 4, and withdraws the blank from the magazine to the limit of the downward movement of the cup 118, which in the latter position lies just below the level of the plates 116 underlying each magazine.

The blanks withdrawn from the magazines rest upon the top of the plates 116 and are pushed forwardly into position to be operated upon by pusher elements operated at timed intervals from the main drive shaft 72 by a cam 137 secured to main drive shaft 72 (Figs. 3 and 6), said cam working against a roller 138 mounted on a stud 139 secured to a plate 140 having a slot 141 therein sliding over the sleeve of said cam. Plate 140 is secured by bolts 142 to a rod 143 guided for reciprocation through a hole in shelf 40 by a bushing 143'. A coil spring 144 secured under tension between an arm 145 fixed on rod 143, and an ear 146 secured to shelf 40, holds roller 138 against cam 137.

A gear wheel 147 is journalled in a slot machined vertically into the end of the rod 143 on a pin 148, the ends of which are supported in a hole drilled through the sides of the slot in the rod. The end of the rod projects into a channel machined in a casting 149 secured to the top shelf 39 of the machine and projecting upwardly above the level of the top of the frame 94 between the second and third magazines. A short length of rack 150 positioned to mesh with gear 147 is secured by screws 151 in a channel provided in the casting 149 and a double rack 152 is mounted in a channel of the casting to engage with pinion 147 on the opposite side to that engaging with rack 150. The result of this arrangement is that rack 152 will be moved in the same direction as rod 143 but through twice the distance. A gear wheel 153 is mounted to engage with the side of the double rack 152 opposite to that which engages gear 147. Gear 153 is mounted in a recess machined in the casting 149 and rotates freely on a pin 154 secured in the wall of the recess. An idler gear 155 is mounted below gear 153 in a recess machined in the casting 149 and rotates freely on a pin 156 secured in the wall of the recess. The described arrangement of gears 147, 153 and 155 acts to steady the rack 152 in movement while the upper end of rod 143 is steadied by the engagement of the gear 147 mounted thereon with racks 152 and 150.

The amount of movement given the rod 143 and rack 152 in upward direction is dependent on the throw of cam 137, but an adjustment is provided for the amount of downward movement of the rack and therefore of the rod 143. This adjustment is effected by a stop or limit nut 157 (Fig. 6) mounted on a threaded stem 158 secured in any suitable way to the top of the rack and projecting through a hole 159 drilled through the top of the casting 149.

The means acting to move the blanks withdrawn from the magazine and feed them to means for folding the blanks into containers are driven by means of a gear 160 mounted in a recess in casting 149 and meshing with gear 153. Gear 160 is secured to a shaft 161 (Fig. 5) extending through the casting and across frame 94 below and in front of the magazine. The ends of shaft 161 are mounted in bearings in the sides of the frame. Two chain sprockets 162 (Fig. 5) are keyed to shaft 161 below each magazine, and a little inwardly of the sides thereof. Chain sprockets 163 are aligned with sprockets 162 mounted to rotate freely on shaft 92. An endless chain 164 is trained over sprockets 162 and 163, the upper run of the chain being guided for horizontal movement by a horizontal plate 165 secured by its edges to plates 116 and engaging against the under side of the chains.

Mounted on the upper run of the chain 164 are blank feeder or pusher elements 166 which travel in slots in the metal plates 116 under the magazines and are provided with blank engaging heads 167 which travel just above the upper surface of the plates 116 and below the bottom blank in each magazine. It is to be noted that the vertical angles forming the corners of the magazines are machined so that they clear heads 167.

Figure 33:
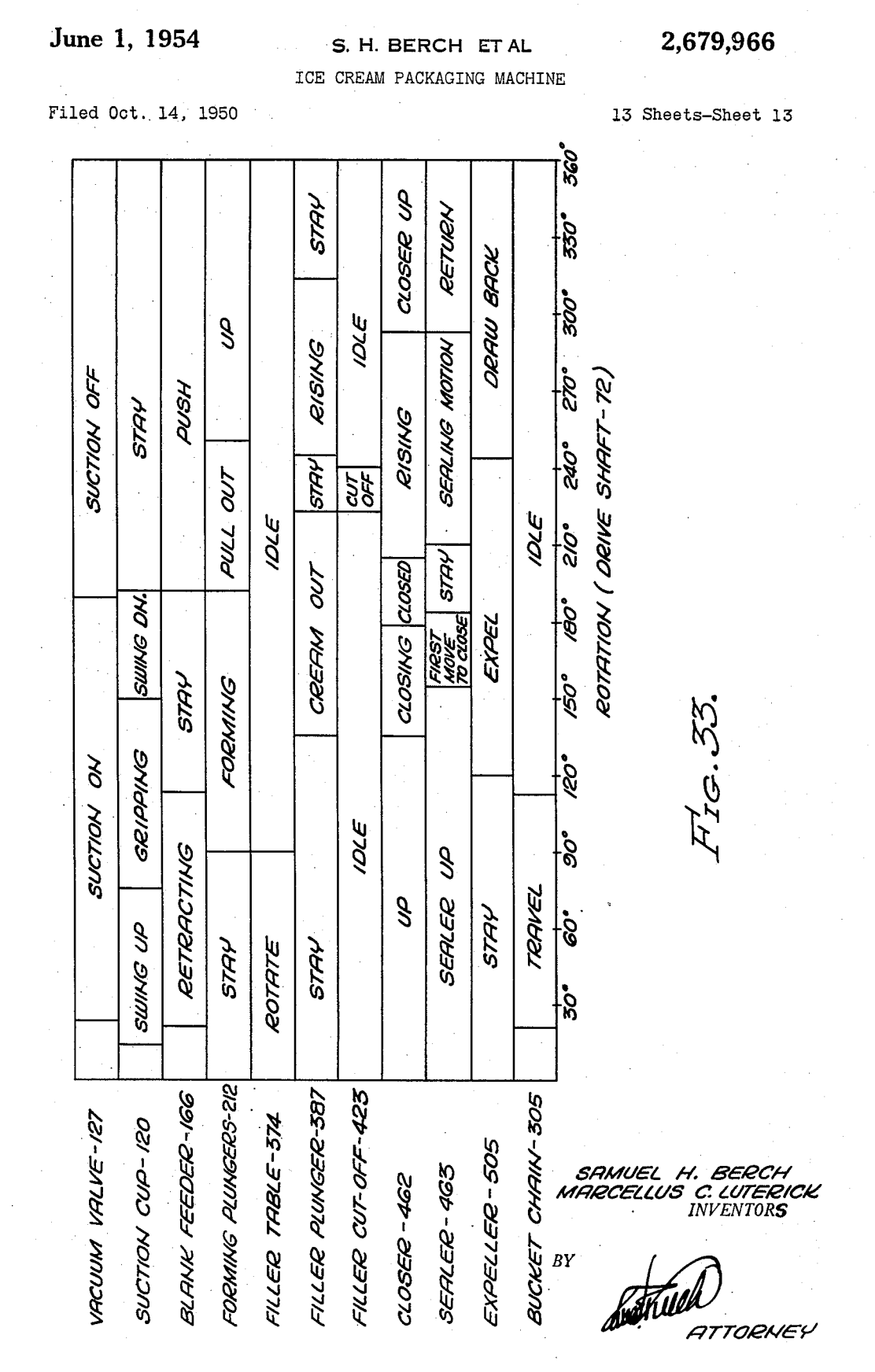

By reference to Fig. 33 it will be noted that the blank feeder elements 166 are retracted to the outside of the magazines, as shown in Fig. 5, while the suction arms 117 with their cups 120 engage the bottom blank in each magazine and have reached the stay or dwell position outside the magazine before the suction arms and cups being their downward movement, pulling the yieldable blanks past the small angle brackets on which the stacks of blanks are supported. The pusher feeder elements begin their forward movement immediately suction is broken to the cups 120 and after the latter parts have reached their stay or dwell position just below the level of the top surface of plates 116.

Figure 7:
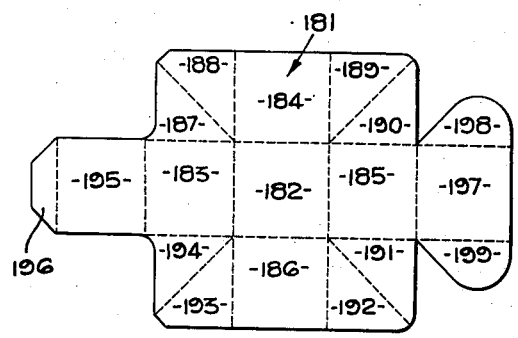
Fig. 7 is a plan view of a container blank suitable for use in said machine.

The form of the blanks 180 is clearly shown in Fig. 7 and consists of a square center section 181 which is scored to define, when folded, a bottom panel 182, four side panels 183, 184, 185, 186, the bottom and side panels forming a cross in the flat blank, and gussets on foldable corner pieces of rectangular shape before folding, between the side panels, but the gussets are each scored along a center diagonal line running outwardly from the junction between the adjacent side panels at an angle of 45° to the borderline of the gussets. The gusset parts are indicated by the numerals 187, 188, 189, 190, 191, 192, 193, and 194 running clockwise around the bottom panel 182. Gussets 187, 188 and 193 and 194 are cut away as indicated in Fig. 7 for a purpose later explained when describing the closing of the cups. An inner cover panel 195 projects from side panel 183 and terminates in a tab 196. An outer or top cover 197 projects from the side panel 185 and is formed with lateral sealing flaps 198, 199.

The blanks 180 are positioned in the magazines with the inner cover panels 195 all pointing toward the right as seen when looking from the magazines along the length of the machine, and therefore with all the outer covers or tops 197 extending in the opposite direction, as shown in Fig. 1.

After the bottom blanks in each magazine have been pulled down as described and engaged by the pusher heads 167 of the feeding mechanism, they are moved into position under container forming mechanism, being guided by upstanding flanges 200 (Figs. 1 and 13) extending along the edges of the plates 116 under each magazine and accurately located with reference to the container forming mechanism by stops 201 (Fig. 13) secured to the plates 116. It will be seen that the travel of the feeding elements must be capable of accurate adjustment to bring the blanks just up to the stops 201, this adjustment being provided, as previously described, by manipulation of nuts 157.

The forming mechanism comprises a container folding die 210 which is similar in all material respects to the folding die utilized in the prior patent of Samuel H. Berch No. 2,500,922 to which reference may be made for specific details of construction. The die is arranged below openings 211 (Figs. 13 and 14) in plates 116 aligned with square plungers 212 which are moved downwardly at timed intervals, each downstroke of the plungers first engaging the bottom section 182 of the blank and forcing it downwardly through the die which is effective to fold the blank along the scored lines therein around the end of the plunger.

Figure 8:
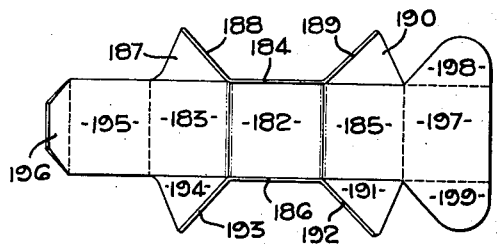
Fig. 8 is a plan view showing said blank as partly formed in an initial step of the container forming operation.
Figure 9:
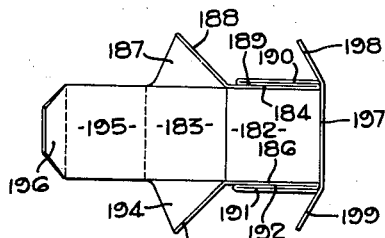
Fig. 9 is a view similar to Fig. 8 and illustrates the next step in said container forming operation.
Figure 10:
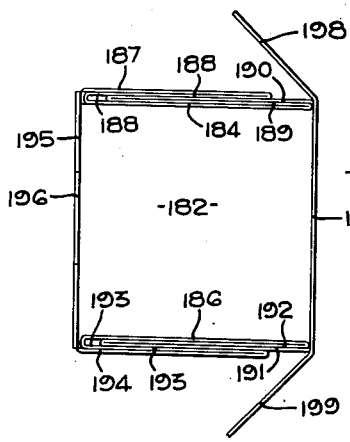
Fig. 10 is an enlarged view similar to Fig. 9 and illustrates the completion of the formation of an open container from the blank shown in Fig. 7 with said container ready to be filled.

The successive folding positions of the die blank are shown in Figs. 8, 9 and 10. In Fig. 8 the side panels 184 and 186 have been folded against the sides of the plunger 212 while the gusset portions 188, 189, 192 and 193 have been pulled into vertical position, in turn pulling the portions of the gussets toward side panels 183 and 185 into upwardly inclined position as indicated by the inclined outer borders of portions 187, 190, 191 and 194 in Fig. 8 and causing side panels 183 and 185 to be pulled upwardly.

Side panel 185 and the top cover 197 are then folded against the sides of the plunger 212 with inward gusset portions 189 and 192 folded against the outside of the upturned side panels 184 and 186 and side gusset portions 190 and 191 folded flat against the outside of gusset portions 189 and 192, as shown in Fig. 9, the sealing flaps 198 and 199 of the top cover 197 being bent toward the container. In the position in which the container is pushed clear of the die, the inner cover panel 195 has been pressed flat against the side of the plunger and the gusset portions 188 and 193 have been folded flat against the outside of gusset portions 190 and 191 as shown in Fig. 10, in which condition the containers are stripped off the ends of the plungers and carried to filling mechanism as later explained.

Figure 13:
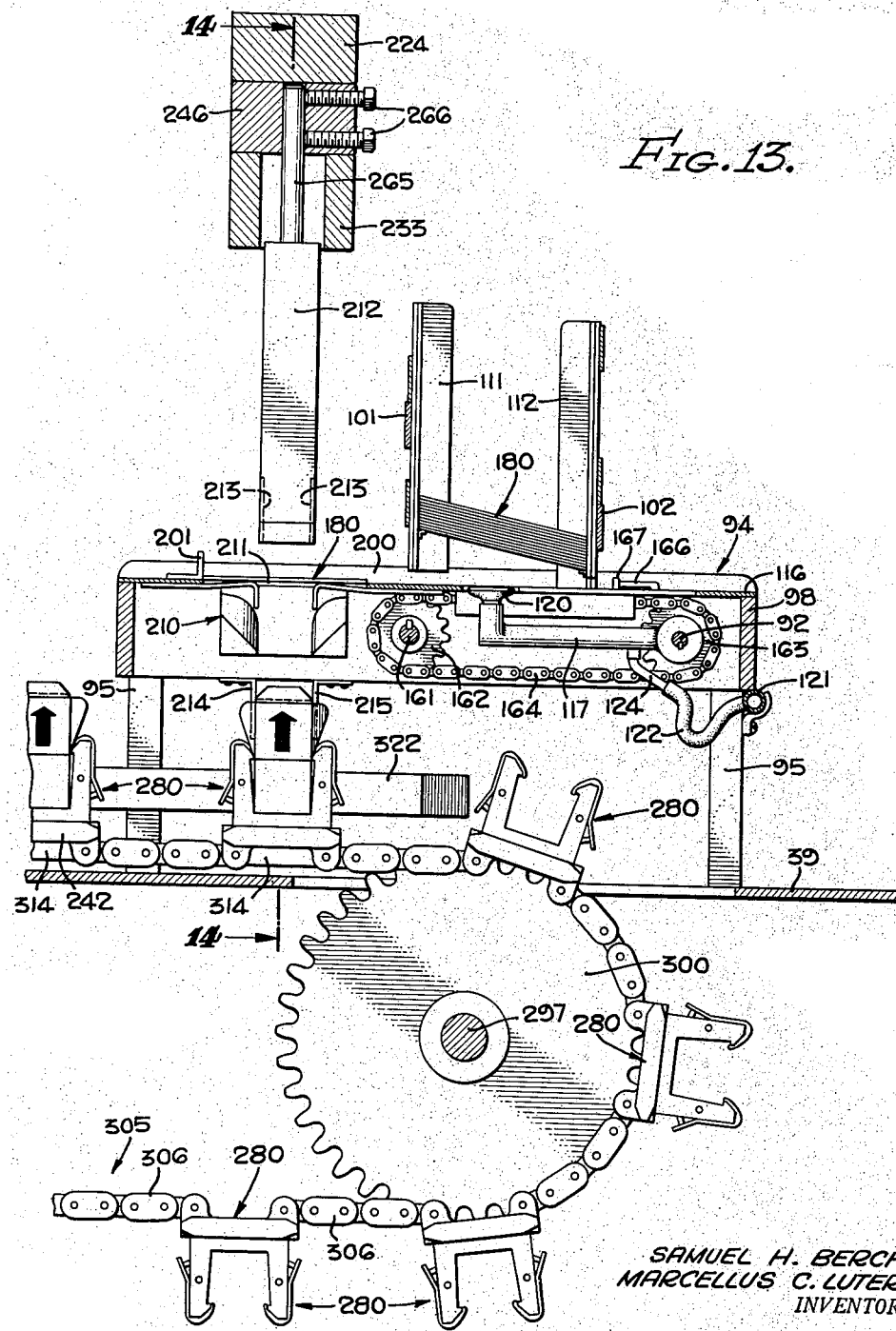
Fig. 13 is an enlarged fragmentary sectional view taken on the line 13—13 of Fig. 1 and illustrating the blank feeding and container forming mechanism.

There are no moving parts cooperating with the folding dies 210 other than the plungers 212, the lower ends of which are provided with slots 213 in the sides transverse to the direction of travel of the blanks and extending from the lower edge upwardly for a purpose to be explained later. The folded container is held flat against the plunger while passing between the bottom of the die and the top of a bucket positioned to receive the formed container by downwardly extending strips 214 and 215 (Figs. 13 and 14).

The plungers are guided for vertical reciprocating movement by vertical rods 219, 220, 221 (Figs. 1 and 14) secured at their lower ends in flanged tubular fittings 222 and 223 which can be seen in Fig. 1 secured to the top shelf 39 of the main housing 35. Rods 219, 220 and and 221 are secured at their upper ends to a crossbar 224 (Figs. 1 and 14) from which depend secondary guide rods 225 to 232 (Fig. 1) secured at their upper ends in the crossbar in any suitable manner. A crosshead 233 (Fig. 14) is mounted to slide upward and downward on vertical rods 219, 220 and 221 and upon the secondary guide rods aforesaid.

The crosshead 233 is vertically reciprocated by a pair of rods 234 and 235 (Fig. 3) secured at their upper ends in the crosshead and guided through the top shelf 39 of the main housing 35 by bearing sleeves 236 having flanges 237 secured to the top shelf 39. Below the top shelf 39, the rods 234 and 235 carry lengths of rack 238 and 239 welded or otherwise secured to the rods. The rods and racks mounted thereon extend downwardly through openings in shelf 40 and are guided at their lower ends in bearings 240 (Fig. 3) secured to the bottom shelf 41 of the housing. The racks 238 and 239 are reciprocated vertically from the main drive shaft as later described. The operating means for rod 235 duplicate those of rod 234 and are not shown.

The movement of the crosshead 238 is transmitted to each of plungers 212 through safety release connections generally indicated at 245 (Fig. 15) which normally secures the crosshead to a bar 246, drilled with holes guiding it for vertical movement on the secondary guide rods 225 to 232. A separate bar 246 is provided for each plunger. All the safety connections are identical in arrangement, and a pair of such connections is provided for each plunger.

The safety release connections 245 is shown in detail in Fig. 15 and comprises a block 247 secured in a recess 248 in the crosshead 233 by a bolt 249, and extending into a recess 250 in the bars 246.

The blocks 247 are releasably connected to bars 246 by means of small plungers 251 and 252 mounted in holes 253 and 254 drilled in the bars, having heads 255 and 256 seating in recesses 257 and 258 in the opposite faces of blocks 247. The plungers are resiliently urged against the block 247 by coil springs 259 and 260 mounted under compression between flanges 261 and 262 at the back of the heads of the plungers and threaded plugs 263 and 264 screwed into the threaded outer ends of the holes 253 and 254. The heads of the plungers project through holes of smaller diameter than, but co-axial with, holes 253 and 254, the flanges 261 and 262 therefore being effective to prevent the plungers from leaving the drilled holes in which they are mounted should some obstruction to the downward movement of any of the forming plungers cause the crosshead 233 to be pulled away from the bars 246 in which the upper end of the forming plunger is mounted. Each forming plunger 212 is secured rigidly in its associated bar 246 by a length of rod 265 which is secured by set screws 266 in the bar 246 and by set screws 267 in the forming plunger.

The operation of the forming plungers 212 by the main drive shaft 72 may be understood by referring to Fig. 3.

The racks 238 and 239 on rods 234 and 235 mesh with gears 268 on shafts 269 mounted in bearings 270 and 271 secured to the base plate 41 of the housing. Smaller gears 272 mounted on the shaft 269 mesh with rack teeth 273 formed at each end portion of a bar 274 mounted for reciprocation in bearings 275 secured to the base plate 41 of the housing. The bar 274 is provided with a laterally projecting stud 276 which engages in a cam groove (not shown) machined in the side face of a cam member 277, secured on the main drive shaft 72. Thus the rotation of the main drive shaft causes reciprocation of the forming plungers in timed relation to the mechanism feeding the blanks, as shown in Fig. 33. It is to be understood that the driving arrangement for rods 234 and 235 is identical but only the drive for rod 234 is shown in Fig. 3.

Container bucket conveyor

The folded containers carried on the lower ends of the plungers passing through the folding dies are deposited in buckets 280 formed as parts of an endless chain, the driving means for which will first be described with reference to Figs. 3 and 17.

Toward the lefthand end of the machine, as seen in Fig. 3, a bevel gear 281 is secured to the main drive shaft 72 and meshes with a bevel gear 282 secured to a cam drive shaft 283 mounted in bearings 284 and 285 secured to the lower shelf 41 of the housing.

On shaft 283 is mounted a drive element or cam 286 formed as a turn and a half of a modified worm but only the entering and leaving portions of the worm 286 have any lead. Engaging in the worm 286 are conical teeth 287, eight in number, projecting downwardly from a horizontal plate 288 (Fig. 17) the teeth being spaced equally around the plate on pins 289 secured to the plate by nuts 290. The pins are so arranged that as one moves out of engagement with the worm the next pin moves into engagement with the worm.

The plate 288 is fixed on a vertical shaft 291 mounted at its lower end in a bearing 292 secured to the bottom shelf 41 of the housing and projecting upwardly through the shelf 40 and a bearing 293 secured to said shelf.

Fixed upon the upper end of the shaft 291 is a bevel gear 294 which meshes with a bevel gear 295 secured on a horizontal shaft 296 extending transversely across the housing and supported in bearings (not shown) carried by the frame 35. A second horizontal shaft 297 (Fig. 13) is mounted parallel to shaft 296 but at the opposite end of the machine frame 35 in bearings (not shown) provided on said frame.

On both shafts 296 and 297 four chain wheels are arranged, the chain wheels on shaft 296 being aligned with the chain wheels on shaft 297.

Since the chain wheels and chains are identical only one unit will be described and Figs. 13, 16 and 17 are referred to for illustration thereof. The chain wheels secured on shaft 296 are indicated at 299 (Fig. 17) and the chain wheels on shaft 297 are indicated at 300 (Fig. 13).

A chain generally indicated at 305 is mounted on each pair of chain wheels 299 and 300. The chain is formed as an endles band composed of units of a number of links 306 of roller chain and bucket members 280 spaced at equal distances from each other. The construction of the buckets 280 is clearly shown in Fig. 16 and comprises a base 243 having a pair of downwardly extending lugs 308 and 309 at each end spaced to extend over the outer end of the adjacent links of the chain and be secured to said links by pins 310 extending through the lugs, links and the usual bushings 311 which are arranged on pins connecting the links in roller chains. Above the lugs 308 and 309 the base 243 is laterally extended to provide supporting flanges 242 engaging on the lower run with longitudinally extending support strips 312 mounted by vertical supports 313 on shelf 40 of the housing, and supporting strips 314 mounted on the shelf 39 of the housing by spacers 315, the supporting strips being effective to hold the chain and buckets in horizontal position.

A body member 316 is mounted on the base 243, being accurately located thereon by pins 317 secured in the base and extending into bores in the body 316 which is secured to the base by machine screws 318. The body 316 is provided with an upstanding front end wall 319, and a back end wall 320, the sides of the body being open. A large orifice 241 is provided through the base. The containers placed in the buckets 280 are supported along the open sides of the buckets by longitudinally extending flat guide bars 321 and 322 (Fig. 1) mounted on the shelf 39 of the machine housing 35.

The tops of the front and back walls 319 and 320 (Fig. 16) are inwardly beveled as indicated at 323 and 324 and are undercut to provide narrow shoulders 325 and 326 from which the inner faces of the walls are inclined downwardly and inwardly to the bottom of the walls. The height of the walls from the bottom to the underside of shoulders 325 is sufficient to receive the folded side panels of the containers below them and the outer portions 187 and 194 of the gussets (Fig. 10) and incline away from the inner gussets just sufficiently to enable the sealing flaps 198 and 199 to be positioned between them and gusset portions 188 and 193.

Flatbodied hooks 327 and 328 (Fig. 16) are mounted in slots cut through walls 319 and 320, midway of their length, the hooks being pivotally mounted on pins 329 and 330. The backs of the hooks are formed as flat strips 331 and 332 extending at right angles to the body of the hooks and limiting the inward movement of the hooks in the slots in which they are mounted. The backs of the hooks are extended below the pivotal mounting of the hooks and bent outwardly to form tails 333 and 334. Pins 335 and 336 are secured to tails 333 and 334 and are aligned with holes 337 and 338 drilled into the walls of the buckets below the slot. Small coil springs 339 and 340 are mounted in compression between tails 333 and 334 and the inner ends of the holes in the walls. The outer ends of the springs are mounted around the pins 335 and 336 and bear against the tails 333 and 334.

The heads of the hooks are rounded inwardly as indicated at 341 and 342 and are provided with well defined hooked upper inner ends 343 and 344 which are received in the slot 213 formed in the side faces of the forming plungers 212 and which normally project inwardly of the shoulders 325 and 326 and hold the edges of the folded containers open but do not contact the cutaway outer gussets 167 and 194. The forming plungers at the end of their downward movement push the sides of the container below shoulders 326 and hooked ends 344. The hooks act to strip the containers from the plungers, as the latter return upward.

The intermittent movement of the chain 305 and bucket 307 locates a bucket below the forming plungers and it is held in that position by the no-lead portion of the worm 286 (see Figs. 3 and 17) engaging with a conical tooth on the chain driving disc 288 during the downward movement of the forming plungers to fold and deposit a cup in the bucket, as diagrammatically shown in Fig. 33, and after the plungers have been retracted upwardly, the chains are rapidly moved by the lead portion of the cam worm 286, moving the buckets with containers therein toward the filling means and another transverse row of buckets under the bank of forming plungers.

*Container filling mechanism*

The mechanism for filling the containers is shown in Figs. 1, 2, 3, 16, 17, 18 and 19 and is driven from the main drive shaft 72 through a bevel gear 350 (Fig. 3) secured to said shaft and driving a bevel gear 351 secured on a shaft 352.

It is pointed out that bevel gear 350 also drives an identical shaft 352' and parts operated thereby, which duplicate the parts now to be described and are not therefore shown.

The shaft 352 is mounted in bearings 353 and 354 secured to the shelf 41 of the housing 35 of the machine.

A bevel gear 355 (Fig. 19) is secured to the end of shaft 352 and engages with a bevel gear 356 secured on a vertical shaft 357 mounted at its lower end in a bearing (not shown) secured to the shelf 41 of the housing 35, and journalling at its upper end in a bearing 358 secured to the underside of shelf 40.

Secured to the upper end of shaft 357 is a disc 359 having mounted thereon a proof pin 360 secured in the plate by nut 361, a roller 362 being mounted on proof pin 360. A detent plate 363 is formed integral with disc 359 or is secured thereto, and provided with a cutout 364 as in the usual Geneva construction. The roller 362 engages in the slots 365 of a Geneva drive wheel 366, having eight such slots, and mounted on a sleeve 367 keyed to a pump frame 368 having a central boss 375 bored to fit on the sleeve and having a radial plate like flange 376 which is supported for rotation on a platform 369 supported by vertical members 370 from the top shelf 39 of the housing. Sleeve 367 is guided by a bearing sleeve 371 secured to top shelf 39 which is provided with a hole for passage of the sleeve. By the construction described the pump frame 368 is intermittently rotated to eight positions in each complete revolution of the Geneva wheel 366.

A circular track 372 (Fig. 19) concentric with the axis of the sleeve 367 is cut in platform 369 in which is mounted a wide ring 373 which constitutes the lower member of the pump frame, the upper member of the frame being provided by a plate 374 having a central hole 377 closely fitting the central boss 375. Plate 374 and ring 373 are machined to provide eight cylinder barrel seats 378 and 379 in which cylinder barrels 380 are fitted, and the plate and ring are drawn together by bolts 381 (Fig. 18), thus clamping the cylinder barrels in place, to provide a rigid assembly.

The pump assembly is rotated from frame 368 (see Fig. 18) by clamps 345 formed as bridge pieces having one end 382 resting on frame 368 and the other end 383 resting on the ring 373, which is provided with a number of projections 384 (Fig. 19) fitting in corresponding recesses in member 376. Tall stems 385 having reduced diameter threaded lower ends and having their heads projecting through openings in plate 374, engage against the top of members 345 and pass through plain holes therein into threaded holes in member 376 and are provided with knurled heads 346 by which the pressure between ring 373 and platform 369 may be adjusted.

A pump piston 387 is mounted in each cylinder with its piston rod 388 extending outwardly through an externally threaded bushing 389 screwed into a threaded hole centrally drilled in each cylinder seat in plate 374, and held in adjusted position by a lock nut 390. The upper end of each piston rod is fitted with a wear button 391. Ring 373 and platform 369 are provided with aligned holes 392' and 393' of slightly less diameter than the barrels 380.

At diametrically opposite points on the under side of platform 369 and transversely of the direction of travel of the buckets 288, filling spouts 392 are secured, as for instance by flathead screws 393 (Fig. 19) while at diametrically spaced points between the filling spouts ice cream supply pipes 394 (Fig. 1) are connected to threaded union members 395 also aligned with openings 392' and 393' in advance of the filling spouts 392 in the direction of rotation of frame 368. As the pump cylinders are brought by rotation of frame 368 over the openings admitting ice cream under pressure from pipes 394 to the cylinders, the ice cream fills the cylinders pushing each piston to its upmost position. Later in its rotation, each piston rod so elevated is brought to position under a double armed member 396 operated to force said rod and the piston thereon downwardly and discharge the ice cream through a filling spout 392 into an open container in a bucket temporarily standing below the filling spout.

The means for operating member 396 are driven directly from the main driving shaft 72 and comprise a cam 400 (Figs. 3 and 19) secured to the shaft 72 and formed with a cam groove 401 in a side face thereof. A roller 402 mounted on a pitman 403 by a pin 404 is engaged in the groove in the face of cam 400. Pitman 403 is guided for horizontal reciprocatory movement by a sleeve 405 mounted on the shaft and provided with a radial flange 406 which abuts the outer lateral face of the pitman and holds roller 402 in the groove in the cam. The pitman is cut out to ride on a hub 400 projecting from the cam.

The opposite end of the pitman 403 is provided with a length of rack 408 which engages with a pinion 409 secured on a short shaft 410 carried in bearings in a vertically mounted casting 411 secured to the base plate 41 of the housing directly below sleeve 367. A larger gear 412 is also secured to shaft 410 and engages with a rack 413 secured to a rod 414 mounted for vertical reciprocation within sleeve 367. Double armed member 396 is provided with a square socket 415 fitting on a square 416 at the upper end of rod 414 and is secured thereon by a nut 417 screwed onto a threaded extension 418 of rod 414 and bearing down on member 396.

When the pistons 387 of the cylinders resting below the member 396 have been fully depressed cut-off means shown in Figs. 3, 20 and 21 are operated. The cut-off means generally indicated at 423 in Fig. 20 are operated by a cam 424 secured on shaft 64 (Fig. 3) which operates a plunger type switch 425 connected in the circuit of a solenoid 426 mounted on a bracket 348 secured to and between right and lefthand platforms 369. The plunger 427 of the solenoid is resiliently held in projected position by a coil spring 422 secured at one end to an abutment 429 on a bar 349 which is secured to the platforms, and at its other end is connected to a link 430 connected at one end to the plunger 427. The plunger is connected by the other end of the link 430 to an arm 431 secured to a shaft 432 extending transversely of the direction of movement of the containers supported in the buckets 299, and supported in bearings 433 secured to the underside of the top shelf 39 of the housing 35. Arms 444 are secured to shaft 432 in alignment with each filling station and are connected to cut-off blades 445. Each blade 445 comprises a flat metal strip guided in slots 446 cut across the lower end of the filling spouts 392 and the strip is bent up at its outer end to provide flanges 447 secured to an arm 444 by a small bolt 448. The metal of the blade is cut out at its forward end as indicated at 449 in a curve approximating that of the opening 350 at the bottom of the filling spout 392. An opening 450 is cut in the blade 445 immediately behind the cutaway at the front end of the blade, leaving a narrow ice cream shearing portion 300 of the blade which can be moved through the ice cream in its path with very little effort or drag on the ice cream.

*Container closing and sealing mechanism*

The filled containers in their buckets are then moved into position within container closing and sealing mechanism indicated generally at 461 (Fig. 2) and each comprising a closing mechanism 462 and a sealing mechanism 463 as indicated in Figs. 25 and 27.

The closing mechanisms 462 which, of course, are duplicated for each production line, are driven in common directly from the main driving shaft 72 as shown in Figs. 3 and 23 by a cam 451 secured on shaft 72 and provided with a cam groove 452 in its side face. A roller 453 is mounted on a pin 301 secured to a plate 454 secured to a vertical shaft 455 and rides in the cam groove. Shaft 455 is guided for vertical reciprocation by a vertical sleeve bearing 456 secured to the base plate 43 of the housing and into which the lower end of shaft 455 is fitted. A short rack 458 is mounted on the upper end of shaft 455 within bearing 457 and meshes with a gear 459 secured on a shaft 460 extending transversely of the underside of the housing top shelf 39 and supported at its ends in bearings (not shown) carried by the housing.

Secured on shaft 460 below each closing mechanism 462 is a gear 464 which engages with a short rack 465 secured to a rod 466 mounted for vertical reciprocation in a small housing 467 secured to the underside of the housing top shelf 39. Rod 466 extends through an opening in shelf 39 and its upper end is guided in a small housing 467' secured to said shelf. The upper end of the rod 466 is formed with rack teeth 468 meshing with a gear 469 mounted on a shaft 470 on which closing member 471 is mounted. Shaft 470 is supported in bearings in housing 467' and in a bearing member 472 located on the further side of the closing member and secured to the housing top 39. The operation of the closing member will be later described with reference to Figs. 25 through 29.

The sealing mechanism 463 is directly driven from the main driving shaft 72 as shown in Fig. 24 by a cam 475 secured on shaft 72 and having a cam groove 476 formed in its side face. A roller 477 is mounted on a plate 478 on a pin 302 projecting therefrom. Plate 478 is secured to a vertical shaft 479. Roller 477 engages in cam groove 476 in cam 475. The lower end of shaft 479 is guided in a vertical sleeve bearing 480 secured to the lower shelf 41 of the machine housing 35 and the upper end of the shaft is guided in a small housing 303 secured to the underside of the main housing top 39. A short rack 481 is mounted on the upper part of rod 479 and meshes with a gear 482 within housing 303 secured on a shaft 483 extended transversely of the main housing top and is supported at its ends in bearings (not shown) secured to the main housing top. Below each sealing mechanism 463 a small housing 484 is secured to the underside of the main housing top 39. Shaft 483 extends through housings 484 and a gear 485 is secured on the shaft within each housing. A vertical rod 486 is mounted in each housing and a rack 487 is secured to the lower end of the rod and meshes with gear 485. Rod 486 extends upwardly through the top of the main housing into a housing 488 secured to the top of the main housing and formed to receive and guide the upper portion of shaft 486 in which rack teeth 489 are cut. A gear 490 meshes with rack teeth 489 and is secured on a shaft 491, one end of which is carried in bearings in housing 488 and the other end of which is supported in a bearing member 492 spaced laterally from housing 488 (Fig. 1). Each sealing member 495 mounted on shaft 491 is formed of two parts of which one, 497, is immovably secured on shaft 491 and is formed as a rectangular plate of the same area as the top of the containers holding ice cream, and supported in the buckets, while the second part 496 (Fig. 26) is arranged to be against the back of part 497, and is pivotally mounted on shaft 491 by drilled lugs 498 extending from the part and surrounding shaft 491. Part 496 is provided with forwardly projecting wings 499 and 500 extending beyond the sides of plate 497 and spaced apart the exact width of the outer cover of the container when the sealing flaps of the top cover have been bent forward at right angles to the top cover. Parts 496 and 497 are normally held together by the legs of a spring 304 wound around shaft 491 between fingers 493 formed by bending the ends of the spring into parallelism.

The sequence of operations of the closing member 471 and sealing member 495 are shown in Figs. 24, 25, 27 and 28. Cam 451 first operates to raise shaft 455 which through the various racks and gears rotates shafts 470 clockwise. The closing member 471 is therefore swung towards the inner cover 195. Closing member 471 comprises an upper portion at right angles to its lower portion, which is swung from the upwardly inclined position of Fig. 24 into the position shown in Fig. 25 in which the lower portion of member 471 has pressed the inner cover 195 flat and horizontal on the top of the filled container, while the tab 196, which projects from the outer edge of the inner cover, has contacted, while still in the plane of the inner cover, the upstanding outer cover, and the sharp angle between the upper and lower portions of the closing member has engaged the inner cover within its outer boundary and moved over the inner cover, bending the tab upwardly until in the position shown in Fig. 25 the tab is held between the bottom edge portion of the upstanding outer cover 197 and the upper portion of closing member 471. An enlarged view of the container at this time is shown in Fig. 11.

Figure 11:
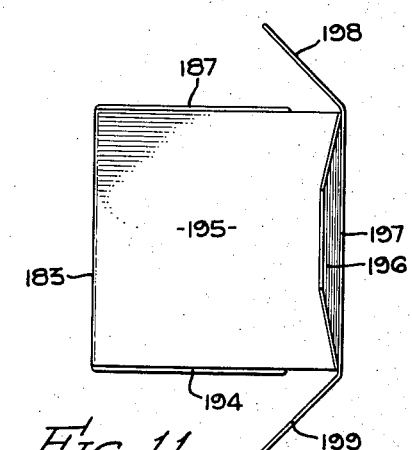
Fig. 11 is a plan view of the container shown in Fig. 10 as this appears after it has been filled and after an initial step in the closing and sealing of the container has taken place.

The sealing member 495 is then rotated forwardly, with parts 496 and 497 in contact, by cam 475 raising shaft 479 from the rest position shown in Fig. 25 in which the condition of the container is shown in Fig. 11 to the position shown in Fig. 23, in which part 497 has contacted and begun to bend forwardly the outer cover 197 while the sealing flaps 198 and 199 have been bent accurately at right angles to the outer cover by engagement between the inside of wings 499 and 500 of member 496 and the side edges of closing member 471. Member 471 is moved from the position shown in Fig. 27 to the position shown in Fig. 28. Closing member 471 is moved toward inoperative position and as shaft 491 of the sealing mechanism continues to rotate, wings 499 and 500 are pulled down on the inwardly beveled upper ends of hooks 327 and 328 by the action of spring 498 as platepart 497 continues to rotate forwardly and downwardly which results in the upper ends of the hooks being pressed back into the slots in which they are mounted until the forward edges of wings 499 and 500 are stopped on the beveled upper edge of walls 319 and 320 of the buckets as shown in Fig. 28.

Figure 12:
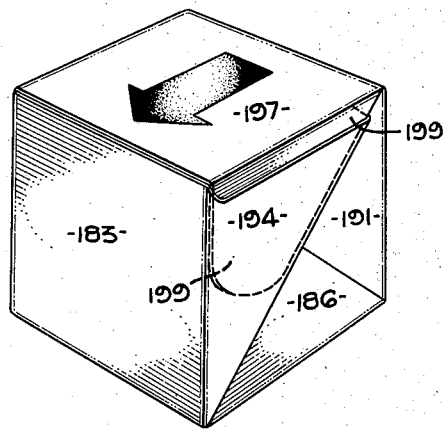
Fig. 12 is a perspective view of the container after this has been filled and fully closed and sealed.

A front view of the parts in the position of Fig. 28, taken on the line 31—31 in that figure, is shown in Fig. 31. Part 497 continues to move downwardly until horizontal, at which time the outer top cover will be flat on the inner top cover and the sealing flaps 198 and 199 will be fully pushed between outer gusset portions 187, 194 and gusset portions 193 and 188, as shown in Fig. 12, said flaps being guided by projecting wings 499 and 500.

*Expelling mechanism for sealed containers*

After the containers have been completely closed the buckets are moved forward into position in which the closed containers are acted upon by the expelling means indicated generally at 505 (Fig. 1) which are directly operated by the main driving shaft 72 through a cam 506 (Fig. 3) secured on the shaft and having a cam groove 507 (Figs. 1 and 22) formed in its side face. A roller 508 mounted on a pin 273 projecting from a plate 509 secured to a vertical shaft 510, runs in groove 507. The vertical shaft 510 is guided at its lower end in a vertical sleeve bearing 511 secured to the base plate 41 of the main housing and is received at its upper end in a bearing and housing member 512 secured on the main housing top 39 at about the midpoint of its width. A short rack 513 is secured on the end of shaft 510 within the housing 512 and meshes with a small gear 514 secured on a shaft 515 having a larger gear 516 mounted thereon and supported in bearings in housing 512. A bar 517 arranged transversely across the housing top 39 extends through housing 512 and a length of rack 515 is secured to bar 517 and meshes with gear 516. Bar 517 is supported above the main housing top 39 on rollers 518 mounted on vertical supports 519 secured to the housing top, a smaller roller 520 being mounted on each support 519 above the bar to accurately guide the bar 517. To the right hand side of each top run of chain and buckets 305, as seen looking in Fig. 1 from the delivery end of the main housing toward the container filling station, a depending arm 521 is bolted or otherwise secured to bar 517, the buckets being intermittently momentarily arrested at a point such that the open side of the buckets are aligned with arms 521 at a discharge point.

On the opposite sides of the buckets to the depending arms 521, horizontally curved tracks 522 are laid upon the top of the main housing, the tracks being mounted on a base 523 secured to the top 39 and provided with side rails 523'.

When cam 506 lowers shaft 510 and thus causes bar 517, through the coaction of the various racks and gears described, to be moved to the right, the arms 521 are moved between the front and back walls of the buckets and expel the filled and completely closed containers, from the buckets onto the curved track, the closed containers being intermittently moved along the track by the movement of the last container to be pushed onto the track.

It will be understood that the containers may be moved along the tracks 522, and from the delivery end thereof, by a separate power conveying means if desired.

The preceding description explains the mechanism of our novel machine but some parts appearing in the drawings and not previously explained will be referred to.

In Fig. 1 the pipe 525, to which the ice cream supply pipes 394 shown in Fig. 19 are connected, leads from an ice cream machine (not shown) which supplies ice cream in fairly stiff condition to pipe 525 and under pressure.

The spout 526 shown in Figs. 1 and 2 is connected to an inclined trough (not shown) which extends under the filling position of the containers so that any spilt ice cream such as caused by discharge of ice cream into an empty bucket will fall through orifice 241 in the base of the bucket, and be caught and conducted outside of the machine where it may be discharged into a bucket for disposal.

It is thought that the operation of the machine will be clearly understood from the preceding description without a lengthy further description of the operation but a short summary of the more important features of the machine may be found useful.

It is assumed that stacks of blanks have been placed in the blank magazines and that ice cream from the ice cream machine has been admitted to pipe 525 ready for release into the containers, and that the electric motors for the main drive shaft 73 and the vacuum pump have been started but that the clutch lever 56 is in inoperative position.

The operator puts the machine into operation by using one or other of the handles 78—79 projecting from opposite sides of the main housing for engaging clutch 55 whereupon container blanks are withdrawn, formed, filled, closed and sealed, and expelled from the simultaneously operated four production lines, this occurring entirely automatically at a rate of about forty a minute, the operator merely watching to see that each line is functioning properly, which he can readily do, since, except for the container forming and filling operations, the functioning of the mechanisms in each line is open to view.

While only a single embodiment of the invention is disclosed herein by way of illustration, it is to be understood that various changes may be made in the disclosed embodiment without departing from the spirit of the invention or the scope of the appended claims.

We claim:

1. In an ice cream packaging machine, the combination of: a plural conveyor; two series of buckets provided on said conveyor at corresponding spaced points thereon; means for intermittently advancing said conveyor and said buckets a distance equal to the spacing between adjacent buckets in each of said series; means for depositing containers in said buckets at a given station in the progress of said buckets; a rotary ice cream dispensing device having a plurality of diametrically disposed pairs of cylinder barrels mounted symmetrically about the axis of said device; pistons in said barrels having piston rods extending upwardly therefrom out of said barrels; a base having a seat on which said device rotates, said base providing a pair of diametrically disposed charging ports and a pair of diametrically disposed discharging ports with which said cylinders are brought into successive communication by rotation of said device, said discharging ports opening downwardly into a pair of empty containers carried on said conveyor upon each halt being made in the advance of said conveyor; means for supplying fluid ice cream under pressure to said charging ports whereby said cylinders will be charged with ice cream when coming opposite said charging ports, said ice cream lifting said pistons and rods when entering said cylinders; means for intermittently rotating said device coordinately with the intermittent travel of said conveyor; and means for depressing the pistons of each of said diametrically disposed pairs of cylinders when said pair comes into communication with said discharging ports.

2. A combination as in claim 1 in which said device is mounted on and rotated by a hollow shaft; a Geneva wheel fixed on said shaft and intermittently rotating the same; a rod extending through said shaft; and a cross bar on the upper end of said rod, opposite ends of said bar overlying the piston rods of cylinders aligned with said discharging ports, said piston depressing means pulling said rod and bar downwardly from beneath said shaft to cause said bar to engage said piston rods to depress said pistons and discharge ice cream into said containers.

References Cited in the file of this patent

UNITED STATES PATENTS

| Number | Name | Date |
| --- | --- | --- |
| 997,145 | Lines | July 4, 1911 |
| 2,241,942 | Berch | May 13, 1941 |
| 2,358,292 | Malhiot | Sept. 12, 1944 |
| 2,382,619 | Earp | Aug. 14, 1945 |
| 2,412,370 | Tascher et al. | Dec. 10, 1946 |
| 2,462,254 | Campbell | Feb. 22, 1949 |
| 2,500,922 | Berch | Mar. 21, 1950 |
| 2,523,667 | Palmer et al. | Sept. 26, 1950 |